W. R. DAVIS.
CONTROLLER.
APPLICATION FILED APR. 3, 1913.

1,222,187.

Patented Apr. 10, 1917.

Witnesses
J. L. Johnson
H. Hudson

Inventor
William R. Davis
By Edwin B. H. Tower, Jr.
Attorney

UNITED STATES PATENT OFFICE.

WILLIAM ROY DAVIS, OF SPRINGFIELD, ILLINOIS, ASSIGNOR TO THE CUTLER-HAMMER MFG. CO., OF MILWAUKEE, WISCONSIN, A CORPORATION OF WISCONSIN.

CONTROLLER.

1,222,187.  Specification of Letters Patent.  Patented Apr. 10, 1917.

Application filed April 3, 1913. Serial No. 758,569.

*To all whom it may concern:*

Be it known that I, WILLIAM R. DAVIS, a citizen of the United States, residing at Springfield, in the county of Sangamon and State of Illinois, have invented new and useful Improvements in Controllers, of which the following is a full, clear, concise, and exact description, reference being had to the accompanying drawing, forming a part of this specification.

My invention relates to improvements in circuit controllers particularly applicable to electric motors.

It has among its objects to provide a controller particularly adapted for controlling motor operated valves and the like which will indicate the position of the valve or other operated device.

A further object is to provide a simple, efficient and reliable controller for electric motors which will indicate the direction of the last operation thereof.

A further object is to provide a direction controlling device for electric motors which will automatically stop the motor under certain conditions and indicate the direction of its operation when thus stopped.

Other objects and advantages of my invention will hereinafter appear.

For the purpose of fully and clearly disclosing the nature and advantages of my invention I shall describe the embodiment thereof illustrated in the accompanying drawing, it being understood that the specific form of my invention herein disclosed is not to be considered as unnecessarily limiting the scope of the appended claims.

Figure 1:
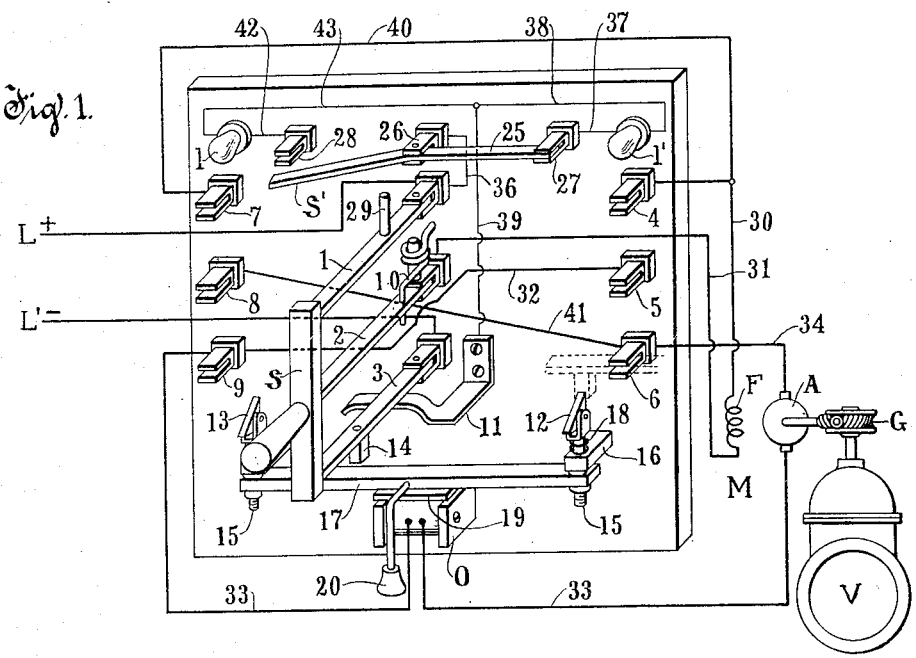
Figure 2:
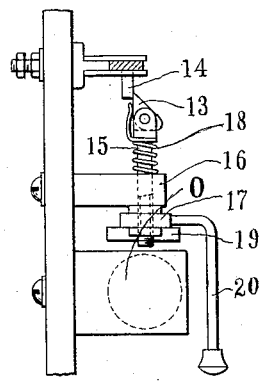
Figure 3:
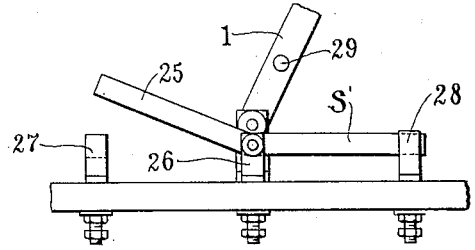

In the accompanying drawing,

Figure 1 shows a perspective view of the controller, and further, shows diagrammatically a motor operated valve controlled thereby; and, Figs. 2 and 3 are detail views of parts of the controller illustrated in Fig. 1.

The controller illustrated includes a double-throw switch S, an overload tripping device O therefor, indicating lamps $l$ and $l'$ and an auxiliary switch S" coöperating with said switch S to selectively energize said lamps.

The switch S is shown as controlling the continuity of the circuit of a motor M and also the direction of operation thereof. The motor M is shown as operating through worm gearing G the gate or plunger of a valve V.

Briefly set forth, the controller functions as follows: When the switch S is thrown to the right it starts the motor in one direction, which it may be assumed is such as to close the valve V, and when moved to the left starts the motor in the opposite direction to open the valve. The switch S is adapted to be tripped in both of its operative positions either manually or automatically by the overload device O. The device O is designed to respond to automatically trip the switch S when the valve V is moved to either of its limits, thereby stalling the motor M. Tripping of the switch S disconnects the motor from circuit. Further, the switch S upon movement in opposite directions sets the switch S' in different positions to cause selective energization of the lamps $l$ and $l'$ upon the return of said switch to its normal or open position. The arrangement is such that when the switch S returns to normal position from its right hand position it energizes the lamp $l'$ and when it returns from its left hand position energizes the lamp $l$. The lamps thus indicate the last operative position of the switch S and in consequence indicate the direction of the last operation of the motor and thereby the position of the valve.

The switch S is shown as a triple pole, double-throw, knife switch. It is provided with blades 1, 2 and 3, all insulated from one another. When the switch is thrown to the right the blades 1, 2 and 3 engage contact clips 4, 5 and 6 respectively and when thrown to the left engage contact clips 7, 8 and 9 respectively. The switch S is biased, by means of a spring 10, to an intermediate position in which all of its blades are out of engagement with all of said contact clips. In this position, however, the blade 3 engages a contact 11 for a purpose hereinafter set forth. The contact 11 is so designed as to be disengaged by the blade 3 when the switch S is thrown to either of its two operative positions. The switch S is adapted to be retained in its operative positions by latches 12 and 13 coöperating with a lug 14 thereon. The latch 12 serves to retain the switch S in its right hand position while the latch 13 serves to retain the switch in its left hand position. The latches are swiveled to stems 15 reciprocably mounted in bearings 16 and connected by a cross bar 17. Each stem is provided with a spring 18 for yieldingly retaining the same in a position whereby its corresponding latch will project into the path of the lug 14 on switch S. Also, each spring has one end bearing against one of the latches whereby the latches will yield upon closure of the switch S and then spring into locking position.

The overload magnet O serves to trip the switch S by withdrawing the latches 12 and 13 from locking position. To this end it is provided with an armature 19 secured to the cross-bar 17. Thus when the magnet O is energized to a sufficient degree to attract its armature it draws the cross-bar 17 and latches 12 and 13 downwardly against the action of the springs 18, thereby releasing the switch S.

The cross-bar 17 is also preferably provided with a handle 20 by means of which it may be manually operated to withdraw the latches 12 and 13 to release the switch S at will.

The switch S' comprises a blade 25 fulcrumed intermediate of its ends in a contact clip 26. The blade 25 is adapted to be rocked in the clip 26 to engage either a right hand contact clip 27 or a left hand contact clip 28. When moved into engagement with either of the clips 27 or 28 it is moved out of engagement with the other. The blade 25 is adapted to be moved into engagement with contact clips 27 and 28 by means of a pin or projection 29 on the switch S. This pin strikes the blade 25 on opposite sides of its pivot in accordance with the direction of throw of the switch S and is so arranged as to throw the blade 25 in the same direction as the switch S. The switch S' coöperates with the blade 3 of switch S and contact 11 to control the circuits of the lamps $l$ and $l'$.

I shall now describe the operation of the controller, at the same time describing the circuit connections illustrated. First, assume that the switch S is thrown to the right to engage contact clips 4, 5 and 6. This results in throwing the blade 25 of switch S' into engagement with contact 27 and in disengaging the blade 3 from contact 11. The switch S is latched in its right hand position by the latch 12.

The aforesaid operation of the controller completes the motor circuit. This circuit may be traced from line L to switch blade 1 and contact clip 4, by conductor 30 through the field winding F of the motor M, by conductor 31 to switch blade 2 and contact clip 5, by conductor 32 to contact clip 9, by conductor 33 through overload magnet O and the armature A of the motor, by conductor 34 to contact clip 6 and through switch blade 3 to line L'. The motor is thereby set in operation and operates the valve V. During the operation of the motor both lamps $l$ and $l'$ are disconnected from circuit.

When the valve reaches its limit of movement it stalls the motor. The motor thus becomes electrically overloaded, causing the magnet O to trip the switch S. The switch S when tripped returns to normal position, thereby disconnecting the motor from circuit. Also, it establishes contact between the blade 3 and the contact 11, which results in completing the circuit of the lamp $l'$. This circuit may be traced from line L to contact blade 1, by conductor 36 to blade 25 of switch S' to contact clip 27, by conductor 37 through lamp $l'$, by conductors 38 and 39 to contact 11 and switch blade 3 to line L'. The lamp $l'$ is thereupon energized and remains energized until the switch S is again operated. This selective energization of the lamp $l'$ thus serves to indicate that the switch S was last thrown to the right and thereby indicates that the motor and valve were last operated in a corresponding direction.

Assume now that the switch S is thrown to the left into engagement with contact clips 7, 8 and 9. It will then throw the blade 25 of switch S' into engagement with contact clip 28 and break circuit between blade 3 and contact 11, thereby deënergizing lamp $l'$. With the switch S in this position the motor circuit may be traced from line L to blade 1 and contact clip 7, by conductors 40 and 30 through the motor field winding F, by conductor 31 to switch blade 2 to contact clip 8, by conductor 41 to contact clip 6, by conductor 34 through the motor armature A and by conductor 33 through the overload magnet O to contact clip 9 and thence through the blade 3 to line L'. These connections, it will be observed, reverse the flow of current through the motor armature without reversing the flow of current through the series field winding and accordingly accomplishes a reversal of the direction of operation of the motor and consequently a reverse operation of the valve V.

When the switch S is released from its left hand position, it again returns to its normal intermediate position, moving the blade 3 into engagement with contact 11. This completes the circuit of lamp $l$. This circuit may be traced to the switch S' as already described, thence to contact clip 28, by conductor 42 through the lamp $l$ by conductors 43 and 39 to contact 11 and blade 3, and thence to line L'. The lamp $l$ is thus energized and maintained energized until the switch S is again operated. This lamp, as will be apparent, indicates that the switch S was last operated to the left and that the motor M and valve V were last operated in a corresponding direction.

While the switch S has been shown as directly controlling the motor, it should be understood that the same might be employed to control the motor through suitable power operated switches, if desired. It should also be understood that the motor might be provided with any preferred form of accelerating means, or any other refinements of control, and that the motor might be of other types than that illustrated.

What I claim as new and desire to secure by Letters Patent is:

1. In combination, a circuit controller having a plurality of operative positions and a neutral position and position indicating means for said controller controlled exclusively thereby, said means being responsive, upon the return of said controller to neutral position, to indicate the operative position last occupied thereby.

2. In combination, a circuit controller having a plurality of operative positions and a neutral position, a plurality of electro-responsive position indicating devices for said controller and selective circuit controlling means for said devices controlled exclusively by said controller to indicate, upon the return of said controller to neutral position, the last operative position occupied thereby.

3. In combination, a circuit controller having a plurality of operative positions and a neutral position, electro-responsive position indicating devices for said controller and selective circuit controlling means for said devices controllable by a single movable element of said controller to effect indication by the selective energization of said devices the position last occupied by said controller upon return thereof toward initial position.

4. In combination, a circuit controller having a plurality of operative positions and being biased to a neutral position, means for retaining said controller in its operative positions and automatically releasing the same under certain conditions and means exclusively under the control of said controller to indicate, upon the return thereof to neutral position, the position last occupied thereby.

5. In combination, a circuit controller including a movable part, a plurality of position indicating devices therefor, and means operable by said movable part of said controller to effect selection of said indicating devices upon movement of said controller to its different operative positions and to effect operation of the selected device upon return movement of said controller.

6. In combination, a circuit controller including a movable member, a plurality of electro-responsive indicating devices therefor and circuit controlling means for said devices operable by said controller member to deënergize all of said devices upon movement of said controller to its different operative positions and to energize said devices selectively upon return movement of said controller according to the operative position last occupied thereby.

7. In combination, a circuit controller including a movable member, a plurality of electro-responsive position-indicating devices for said controller member, and selector and circuit making and breaking switches separately operable by said controller member to jointly govern said indicating devices.

8. In combination, a circuit controller, a plurality of electro-responsive position indicating devices therefor, a circuit making and breaking device operable by said controller upon movement thereof to and from a certain position and a selector device operable by said controller upon movement thereof from said position to other positions to selectively connect said indicating devices to said circuit making and breaking device.

9. In combination, a circuit controller having a plurality of operative positions and being biased to a neutral position, a plurality of sets of circuit connections controlled thereby, means for holding said controller in its operative positions subject to automatic release under predetermined conditions and means governed by said controller to indicate the circuit connections established thereby when tripped, said last mentioned means acting irrespective of the duration of establishment of such connections.

10. In combination, a circuit controller, a plurality of sets of circuit connections controlled thereby, an overload tripping device for said controller and indicating devices selectively rendered effective upon tripping of said device, to indicate the circuit connections last established thereby.

11. In combination, a circuit controller for selectively establishing different circuit connections, connection indicating devices and means rendering said indicating devices ineffective during completion of said connections and effective selectively when said connections are interrupted, to indicate the connections last established.

12. In combination, a circuit controller for selectively establishing different circuit connections and to automatically interrupt the same under certain conditions, connection indicating devices and controlling means for said indicating devices rendering the same ineffective during completion of said connections and effective selectively upon interruption of said connections and in accordance with those last established.

13. In a circuit controller, in combination, a double throw switch, electro-responsive position indicating devices therefor and separate selector and circuit making and breaking switches for said devices both operable by said double throw switch to effect selective energization of said devices upon return of said double throw switch from its extreme positions to an intermediate position.

14. In a circuit controller, in combination, a double throw switch, an auxiliary switch movable to different positions selectively by reverse double throw movements of said switch, a second auxiliary switch to be opened and closed by said double throw switch upon movement to and from an intermediate position and position indicating devices for said double throw switch controlled by said auxiliary switches jointly for selective energization thereof.

15. In a circuit controller, in combination, a double throw reverse switch biased to open position, means for retaining said switch in both of its operative positions and releasing the same under predetermined conditions, a contact connected in circuit by said switch when in open position and disconnected from circuit when said switch is thrown to either of its operative positions, an auxiliary switch operated to different positions by movement of said reverse switch to its different operative positions but not affected by the return of said reverse switch to open position and electro-responsive indicating devices jointly and selectively controlled by said contact and said auxiliary switch.

In witness whereof, I have hereunto subscribed my name in the presence of two witnesses.

WILLIAM ROY DAVIS.

Witnesses:
C. F. BATZMAN,
W. C. COOPER.

Copies of this patent may be obtained for five cents each, by addressing the "Commissioner of Patents, Washington, D. C."